United States Patent [19]

Oswald

[11] Patent Number: 4,521,650

[45] Date of Patent: Jun. 4, 1985

[54] MOUNTING APPARATUS FOR A CONTROL LEVER

[75] Inventor: Charles W. Oswald, Decatur, Ill.

[73] Assignee: Caterpillar Tractor Co., Peoria, Ill.

[21] Appl. No.: 432,898

[22] PCT Filed: Apr. 19, 1982

[86] PCT No.: PCT/US82/00489

§ 371 Date: Apr. 19, 1982

§ 102(e) Date: Apr. 19, 1982

[87] PCT Pub. No.: WO83/03577

PCT Pub. Date: Oct. 27, 1983

[51] Int. Cl.³ .............................................. B60K 20/00
[52] U.S. Cl. .................................. 200/61.88; 74/475;
74/531; 74/540; 200/291
[58] Field of Search .......................... 74/475, 531, 540;
308/237 R, 237 A; 200/291, 61.91, 61.88

[56] References Cited

U.S. PATENT DOCUMENTS

| 3,423,549 | 1/1969 | Sondej . | |
|---|---|---|---|
| 3,677,096 | 7/1972 | Hatman | 74/527 |
| 3,871,244 | 3/1975 | Gressard et al. | 74/491 |
| 3,996,040 | 12/1976 | O'Neill et al. | 192/4 A |

FOREIGN PATENT DOCUMENTS

| 481915 | 3/1952 | Canada . |
| 0075693 | 4/1983 | European Pat. Off. . |
| 2298827 | 8/1976 | France . |
| 582687 | 11/1946 | United Kingdom . |
| 1408609 | 10/1975 | United Kingdom . |

Primary Examiner—Kenneth J. Dorner
Attorney, Agent, or Firm—William C. Perry

[57] ABSTRACT

In the operator's station of many construction vehicles, there is a critical lack of space in which to mount the control levers (12) used to operate the vehicle. The use of mechanical linkages and motion translating devices between the control lever (12) and the actuator has required complicated mechanisms and excessive hardware for the mounting and positioning of the respectively connected components. The mounting apparatus (10) of this invention overcomes these problems by employing a detent mechanism (38) that functions as a rotational positioner between the control lever (12) and an actuating switch (60) assembly as well as an axial positioner used in the mounting of the respective components. The mounting apparatus (10) allows the control lever (12) and the actuating switch (60) to be mounted together for rotation about a single axis (X) to provide a very axially compact mechanism.

18 Claims, 6 Drawing Figures

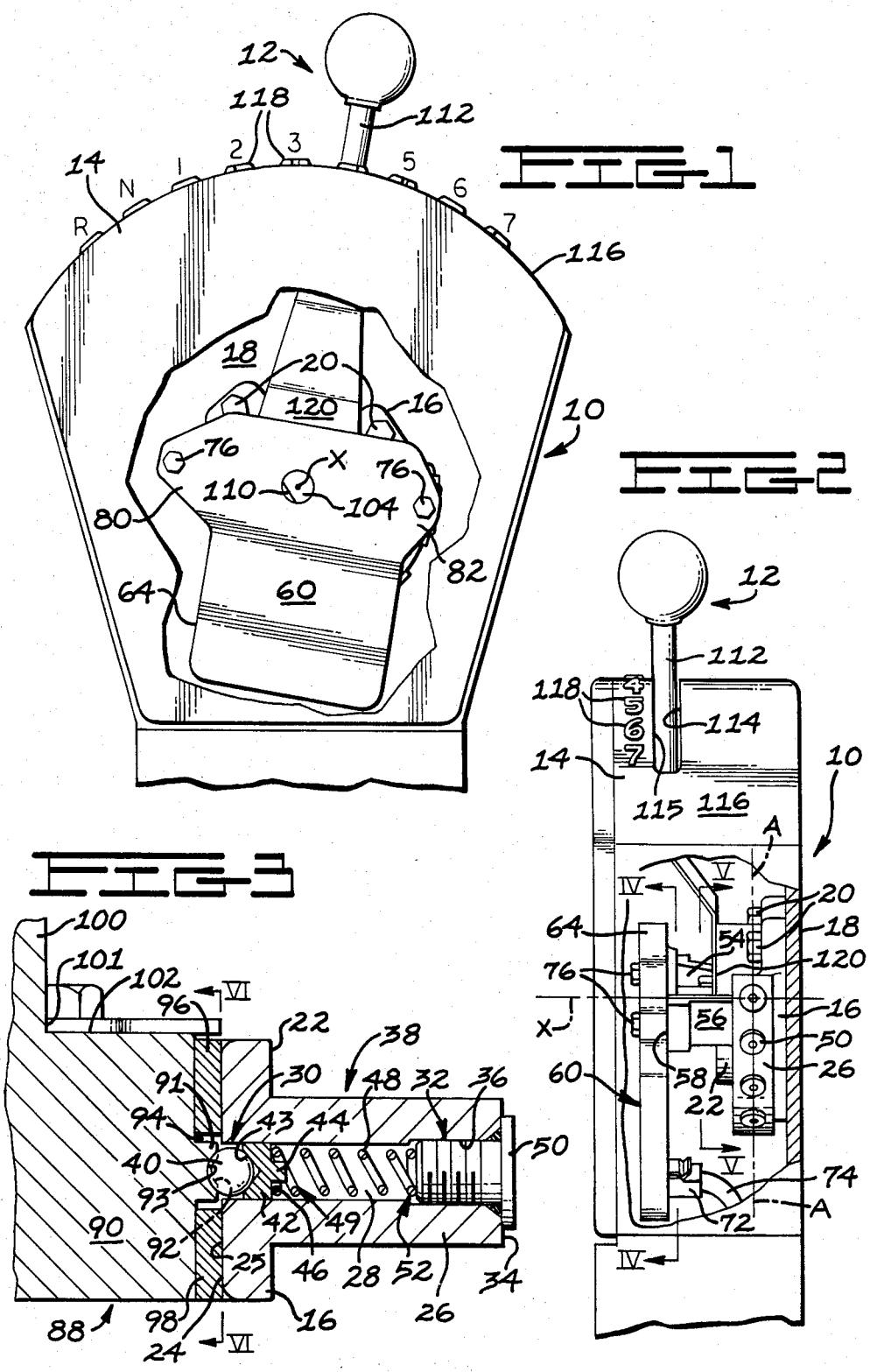

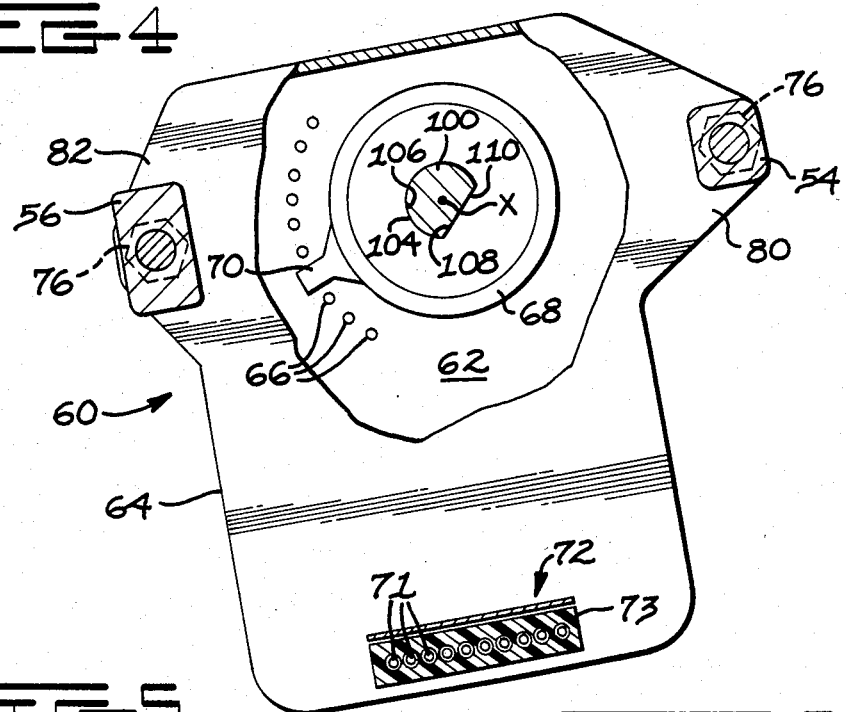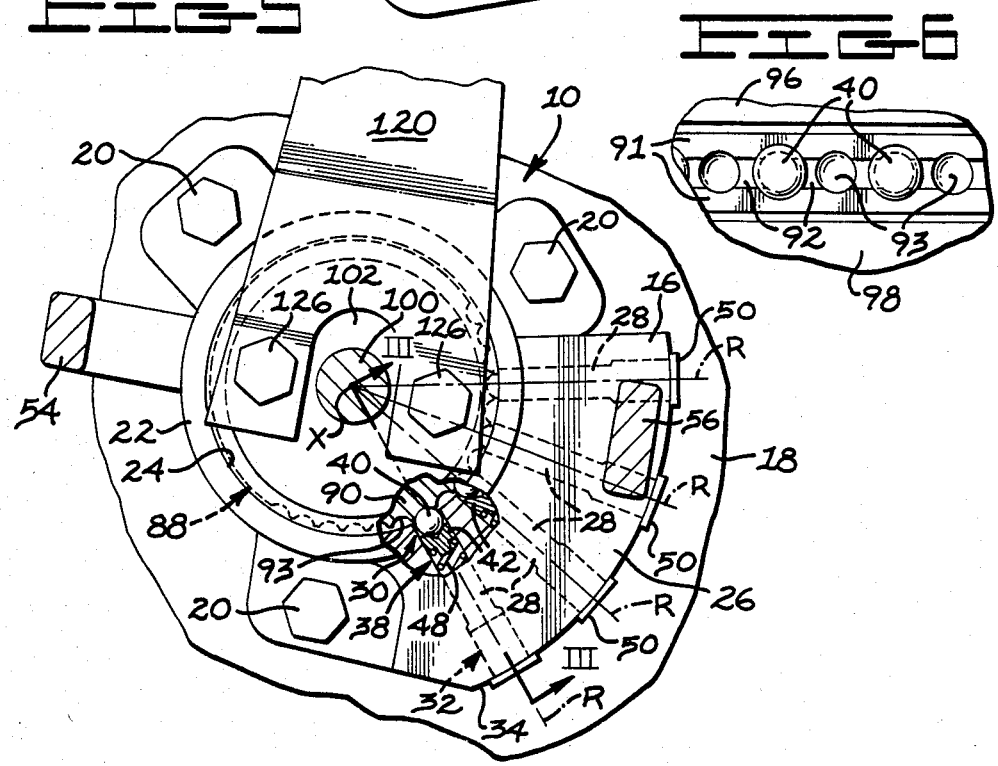

MOUNTING APPARATUS FOR A CONTROL LEVER

TECHNICAL FIELD

This invention relates generally to a mounting apparatus for a control lever and more particularly to a detent assembly employed by the apparatus that axially locates relatively movable components of the mounting apparatus with respect to each other while also functioning as a rotational positioner as the movement occurs.

BACKGROUND ART

In the mounting of control levers in the operator's station of a work vehicle, the amount of available space is always of primary concern. The recent trend of replacing mechanical levers and linkages with electronic componentry has alleviated some of the problem, as in instances wherein electrical switches are actuated by the control lever. The switches are connected to a master control unit which will in turn cause the particular component to which it is attached to functionally respond to the command of the control lever. Electrical wiring is often used to replace levers and linkage, and since no housing other than sheathing is required, the wires can be routed to virtually any location without any significant use of space.

While electronic componentry saves space in its connection between the actuating switch and the controlling unit, there still must be a mechanical connection between the control lever and the switch.

In many designs, such as disclosed in U.S. Pat. No. 3,997,040 assigned to the assignee of this invention, a deficiency in available lateral space requires that the control lever and the switch be mounted in elevationally spaced relationship to each other within a console. If the switch happens to be a rotary switch, a mechanism, such as a bevel gear drive, must be incorporated into the mounting to translate the motion of the control lever into a plane coincident with that of the switch.

The motion translating mechanism, while not requiring any lateral space to speak of, will occupy vertical space within the console by requiring individual mounting and positioning means for the various components.

While the design disclosed in the patent functions satisfactorily, the additional bearings and positioning mechanism required to align the lever, switch, and the motion translating mechanism causes the entire apparatus to become fairly complex and expensive, while still requiring a relatively large amount of overall space within the console.

The present invention is directed to overcoming one or more of the problems as set forth above.

DISCLOSURE OF THE INVENTION

In one aspect of the present invention, a mounting apparatus is disclosed having a support member which defines a generally cylindrical aperture which extends along a central axis. A control lever, which defines a generally cylindrical portion, is rotatably received within the aperture of the support member. A plurality of indentations are positioned along a groove that is formed on the cylindrical portion in a common plane which lies normal to the central axis. A positioning means selectively engages the groove or the indentations of the cylindrical portion of the control lever and positions the control lever both axially and circumferentially with respect to the support member.

In another aspect of the present invention a mounting apparatus for an axially biased control lever is disclosed. The control lever defines a cylindrical portion which has an upraised rib which has a groove disposed therearound and a plurality of indentations formed along the groove in a common plane. The cylindrical portion of the control lever is rotatably received within an aperture extending through a support member along a central axis. A plurality of passages are positioned in the support member that open onto the aperture and are radially oriented with respect to the axis. A sleeve bearing is positioned between the cylindrical portion of the control lever and the support member to allow relative rotation between the two components. A positioning means is located within the passages of the support member and selectively engages the groove and the indentations on the rib. The positioning means locates the control lever both axially and circumferentially with respect to the support member.

With a mounting apparatus of this type, a rotary switch may be mounted to the support member along the axis of the cylindrical portion of the control lever. This arrangement places the switch and the control lever in the same axis of rotation thus eliminating extensive connecting mechanisms. Also, since both the control lever and the switch are mounted to the same support member, the positioning of both components is greatly simplified and the entire mounting comprises a very compact unit. The positioning means also accommodates the axial force that results from the bias of the control lever, thus obviating the need for thrust bearings in the mounting apparatus. Thus, the mounting apparatus remains very simple in construction and is very economical in its use of low cost, non-adjustable bearings.

BRIEF DESCRIPTION OF THE DRAWINGS

FIG. 1 is a diagrammatic, fragmentary side view of a mounting apparatus for a control lever embodying the principles of the present invention;

FIG. 2 is a diagrammatic, fragmentary end view of FIG. 1;

FIG. 3 is a diagrammatic enlarged sectional view taken along line III—III of FIG. 5;

FIG. 4 is a diagrammatic, enlarged sectional view taken along line IV—IV of FIG. 2;

FIG. 5 is a diagrammatic enlarged sectional view taken along line V—V of FIG. 2; and FIG. 6 is a diagrammatic enlarged sectional view taken along line VI—VI of FIG. 3.

BEST MODE FOR CARRYING OUT THE INVENTION

Referring to the drawings, a mounting apparatus 10 for a control lever 12 is shown which is housed within a frame or console 14. The mounting apparatus includes a support member 16 which is releasably secured to a sidewall 18 of the console 14 by a plurality of mounting bolts 20.

The support member has a central body portion 22 which has a cylindrical opening or aperture 24 formed therethrough (FIGS. 3 and 5). The opening 24 defines an inner cylindrical surface 25 in body portion 22 and is positioned about an axis X. An arcuate projection 26 extends from the central body portion in a radial direction with respect to the axis. A plurality of passages 28 are defined within projection 26 and are centered on a plurality of axially aligned radii R. The radii intersect the axis X to establish a common plane A—A. The passages have a first end 30 that opens onto surface 25 of opening 24. A second end 32 of the passages opens onto an outer surface 34 of arcuate projection 26 and is provided with a threaded portion 36.

A plurality of detent assemblies 38 are placed within each of the passages 28. Each detent assembly includes a spherical element such as a ball 40 which is engaged on one side thereof by a plunger 42. The plunger has a first annular portion which forms a seat 43 which receives ball 40. A guide member 44 extends from the plunger and forms a radially extending connecting face 46. A biasing means such as spring 48 is also located within passage 28 and has a first end 49 that engages face 46. The spring surrounds the guide member 44 of the plunger which serves to retain the spring in its proper position with respect to the plunger. A closure element or plug 50, is threadably received within the threaded portion 36 and bears against a second end 52 of the spring 48. Being so arranged, ball 40 is urged toward the first end 30 of the passage 28 and into the cylindrical opening 24 by the spring 48 as it acts between the plunger 42 and the plug 50. In the illustrated embodiment, four of such detent assemblies are positioned within the arcuate projection 26. The size of each spring in the detent assemblies may be varied along with the number of detent assemblies used to establish a desired cumulative spring force.

A pair of mounting legs 54 and 56 extend from support member 16 from diametrically opposed locations. The leg 54 is connected to the central body portion 22 while leg 56 is connected to the arcuate projection 26. Both legs extend parallel to axis X and each has formed thereon a mounting surface 58 (FIG. 2). The mounting surfaces, which are also diametrically opposed terminate at a location which is axially spaced from the central body portion 22 of the support member 16.

A switch assembly 60 of well known construction is shown in FIGS. 2 and 4 having a printed circuit board 62 secured within a generally rectangular casing 64. The circuit board defines a plurality of electrical contact points 66 that are spaced from one another in 10 degree increments and are disposed in a common radial arc. A rotor 68 is also mounted within the casing for rotation relative thereto. A contact engaging arm 70 extends from the rotor and is positioned for movement along the radial arc defined by contact points 66. Contact arm 70 selectively engages each individual contact point to complete a circuit between that contact point and one of a plurality of electrical posts 71 that form the male portion of an electrical socket 72. The posts extend from the casing 64 and receive a female terminal 73 of a wiring harness 74. The wiring harness in turn, delivers an electrical impulse to the main control unit (not shown) of an implement, which in this case is a vehicle transmission. The switch assembly 60 is mounted to the mounting surface 58 of legs 54 and 56 of housing member 16 by a pair of threaded fasteners 76. It will be apparent that the mounting of the switch casing in this manner allows the switch to be positioned so that the axis of rotation of the rotor will coincide with axis X.

A shaft member 88 is positioned along axis X and has a first cylindrical portion 90 that is located within opening 24 of support member 16. An upraised annular rib 91 (FIG. 3) is formed circumferentially around cylindrical portion 90 at the approximate axial midportion thereof. A groove 92 is formed circumferentially about rib 91 to create a relatively shallow depression in the surface of the rib. A plurality of spherical seats or indentations 93 are formed along the groove in spaced relation to each other for a distance of approximately 160° and have a greater depth of depression than that of the groove. The shaft is positioned within the support member 16 with the groove being aligned with balls 40 of detent assemblies 38 and thus plane A—A. The balls are urged into engagement with either the groove or the indentations by the springs 48. The diameter of the first cylindrical portion 90 is less than that of opening 24 which forms a space 94 therebetween. A pair of non-thrust absorbing sleeve bearings 96 and 98 are located in the space on each side of rib 91 to allow relative rotation between the shaft and the support member. A second cylindrical portion 100 of shaft 88 extends axially from the first cylindrical portion 90. Cylindrical portion 100 has a reduced diameter and joins the first cylindrical portion on one end 101, defining a radially extending face 102 on the shaft. A distal end 104 of the second cylindrical portion terminates within a centrally disposed socket 106 of the switch rotor 68. The socket is substantially round except for a flat portion or land 108 defined by the socket. The land registers with a similar land 110 on cylindrical portion 100 so that the rotor will move in aligned, coordinated response to the rotation of the shaft 88.

The control lever 12 has an upper portion 112 that extends through a slot 114 that is formed in a cover member 116 of the console 14. A plurality of lever position indicators 118 are situated along one wall 115 of the slot. A lower lever portion 120 projects downwardly from the cover member 116 and terminates at a location adjacent the radial extending face 102 of shaft 88. The lower portion 120 is substantially flat so as to be mounted directly to the radially extending face 102. The lever is then secured to the face by mounting bolts 126. The lower portion of the control lever is formed of spring steel which biases the lever against the wall 115 of the slot.

INDUSTRIAL APPLICABILITY

In operation of the control lever 12, which in the illustrated embodiment controls a transmission, the lever is movable along slot 114 of console cover member 116. The lever is biased against the wall 115 of the slot so as to always be adjacent the position indicators 118 which correspond to one of a plurality of gear ratios in which the transmission may operate. With the movement of the lever, rotation is imparted to the shaft 88 by way of its connection with the lower portion 120 of the control lever. As the shaft is rotated, the balls 40 of the detent assemblies 38, which nest within the indentations 93 formed on the shaft, are simultaneously urged out of engagement with the indentations. As the balls leave the indentations they remain engaged with the groove 92 until the adjacent indentation is moved into alignment with the balls. In this way, engagement of the detent assemblies with the indentations provides a stop for each gear ratio in the transmission. The indentations are positioned approximately 10° apart and their spacing is coordinated with the spacing of lever position indicators 118. For each stop or detent, the control lever will be positioned opposite one of the indicators.

When the rotation of the shaft causes the detent assemblies to become positioned within the shallow depression provided by groove 92 as previously described, the spring force applied by the detent assemblies provides a centering bias to hold the groove in registration with plane A—A. Thus the shaft 88 is retained from axial movement with respect to the support member 16 which would occur as a result of the axial force created by the biasing of the control lever against the sidewall 115.

Also, with the movement of the control lever and the resulting shaft rotation, the movement of rotor 68 of switch assembly 60 is effected. As it rotates, the contact arm 70 moves from one electrical contact point 66 to the next. Since the contact points are also positioned in 10° increments, the detents will retain the positioning between the contact arm and contact points as well as the positioning of the control lever as previously described.

Alternatively, I contemplate that the ball 40 of the detent assemblies 48, may be constructed of a one-piece plunger having a spherical protrusion for engagement with the indentations 93. The groove and indentations, while being described as being formed on the upraised rib 91, may be formed in the surface of the first cylindrical portion 90. Likewise, the rib 91 could be positioned along one edge of the cylindrical portion, with a single sleeve bearing located between the shaft 88 and the first cylindrical portion 90. Also, while the shaft 88 and control lever 12 are shown mounted to each other by bolts 126 it is conceivable that they may be formed in one piece.

Thus it may be seen from the foregoing description that the detent assemblies 38 provide a means to retain the rotational positioning of the shaft 88 as well as providing a means for axially positioning the shaft within the support member. With the present positioning arrangement, axial forces that occur as a result of the biasing of the control lever 12 against the sidewall 115 of slot 114, are accommodated by the seating of the balls 40 within the spherical indentations 93 while the control lever is stationary or by the seating of the balls 40 within the groove 92 during the rotation of the shaft. This in turn, obviates the need for thrust bearings in the mounting apparatus and results in a greatly simplified structure. Also, rotation of the control lever 12 and the switch assembly 60 occur along a common axis. This enables the entire mounting apparatus to remain very compact and easily mounted where little space is available.

Other aspects, objects and advantages of this invention can be obtained from a study of the drawings, the disclosure and the appended claims.

I claim:

1. A mounting apparatus (10) for a control lever (12), comprising:
    a support member (16) defining a generally cylindrical aperture (24) along a central axis (X);
    the control lever (12) defining a generally cylindrical portion (90) having a groove (92) disposed therearound and a plurality of indentations (93) on the cylindrical portion (90) spaced along said groove (92) in a common plane (A—A) normal to the central axis (X), the cylindrical portion (90), of the control lever (12) being rotatably received within the aperture (24) of the support member (16); and
    means (38) for positioning the control lever (12) both axially and circumferentially within the support member (16) by selected engagement with the groove (92) and the indentations (93).

2. The mounting apparatus (10) of claim 1 wherein said means (38) is disposed within a radially oriented passage (28) that is positioned in the support member (16) and opens onto the aperture (24).

3. The mounting apparatus (10) of claim 1 wherein the means (38) includes:
    a detent assembly having a plunger (42) and a spherical element (40) associated therewith positioned in the passage (28); and
    biasing means (48) for urging the plunger and spherical element (40) toward engagement with the groove (92) and the indentations (93).

4. The mounting apparatus (10) of claim 1 wherein the groove (92) and the indentations (93) are formed on an upraised rib (92) that is circumferentially disposed about the cylindrical portion (90).

5. The mounting apparatus (10) of claim 1 wherein a non-thrust absorbing bearing (96,98) is positioned between said support member (16) and said cylindrical portion (90).

6. The mounting apparatus (10) of claim 4 wherein a bearing is positioned on each side of the rib (92).

7. The mounting apparatus (10) of claim 1 wherein the indentations (93) are spaced from each other a preselected distance to provide rotationally indexed positioning of the lever (12) with respect to the axis (X).

8. The mounting apparatus (10) of claim 1 wherein the control lever (12) is biased in an axial direction and engagement of the means (38) with the groove (92) opposes the biasing force as the control lever (12) is rotated out of engagement with the indentations (93) to maintain the position of the control lever (12) with respect to the common plane (AA).

9. In a mounting apparatus (10) having an axially biased control lever (12) rotatably mounted within a console (14) for movement with respect thereto, the improvement comprising:
    a support member (16) defining a generally cylindrical aperture (24) along a central axis (X) and a plurality of radially oriented passages (28) opening onto the aperture (24);
    the control lever (12) defining a generally cylindrical portion (90) having an upraised rib and a groove (92) disposed therearound and a plurality of indentations (93) formed along the groove (92) in a common plane (A—A) normal to the central axis (X), the cylindrical portion (90) of the control lever (12) being rotatably received within the aperture (24) of the support member (16);
    a sleeve bearing (96,98) positioned between said support member (16) and said cylindrical portion (90); and
    means (38) for positioning the control lever (12) both axially and circumferentially with support member (16) by selected engagement with the groove (92) and the indentations (93), said means (38) being substantially disposed within said passages (28).

10. The mounting apparatus (10) of claim 9 wherein a pair of non-thrust absorbing bearings (96,98) are positioned between the support member (16) and the cylindrical portion (90) on opposite sides of the rib (92).

11. The mounting apparatus (10) of claim 9 wherein the means includes:
    a detent assembly having a plunger (42) and a spherical element (40) associated therewith, positioned in the passage (28); and biasing means (48) for urging the plunger and spherical element (40) toward engagement with the indentations (93).

12. The mounting apparatus (10) of claim 9 wherein the indentations (93) are circumferentially spaced from one another along said groove (92) in preselected increments.

13. The mounting apparatus (10) of claim 8 wherein a switch assembly (60) is mounted on said support member (16) in spaced relationship to said plane (A—A).

14. The mounting apparatus (10) of claim 13 wherein said switch assembly (60) further includes:
   a casing (64) having a plurality of electrical contacts (66) positioned therein; and
   a rotor (68) having a contact engaging member (70), said rotor (68) being rotatably received within said casing (64) for selective engagement of the contact engaging member (70) with the electrical contacts (66).

15. The mounting apparatus (10) of claim 14 wherein a second cylindrical portion (100) having a first end (101) connected to the first cylindrical portion (90) and a second end (104) connected to the rotor (68) of the switch assembly (60), is positioned along the axis (X) to provide movement of the rotor (68) in response to movement of the control lever (12).

16. The mounting apparatus (10) of claim 14 wherein the electrical contacts (66) of the switch assembly (60) are positioned within the casing (64) along a common radial arc in preselected increments corresponding to the incremental spacing of the indentations (93).

17. The mounting apparatus (10) of claim 14 wherein the electrical contacts (66) of the switch assembly (60) are connected to a control unit of a transmission having a plurality of gear ratios and movement of the contact engaging member (70) of the rotor (68) between each of the switch contacts (66) results in the shifting of the transmission from one gear ratio to another.

18. The mounting apparatus (10) of claim 9 wherein the movement of the control lever (12) is rotationally indexed by the engagement of the means (38) with the indentations (93) and axially positioned with respect to the common plane by the engagement of the means (38) with the groove (92) upon movement of said means (38) out of engagement with said indentations (93).

* * * * *